United States Patent [19]

Kühn

[11] Patent Number: 5,347,507

[45] Date of Patent: Sep. 13, 1994

[54] APPARATUS WITH ADJUSTABLE ISOLATION RESILIENCE CONSUMER ELECTRONICS

[75] Inventor: Hans R. Kühn, St. Georgen, Fed. Rep. of Germany

[73] Assignee: Deutsche Thomson-Brandt GmbH, Villingen-Schwenningen, Fed. Rep. of Germany

[21] Appl. No.: 879,163

[22] Filed: Apr. 30, 1992

Related U.S. Application Data

[63] Continuation of Ser. No. 635,145, Dec. 20, 1990, abandoned.

[30] Foreign Application Priority Data

Apr. 29, 1989 [DE] Fed. Rep. of Germany ....... 3914303

[51] Int. Cl.[5] ............................................. G11B 33/08
[52] U.S. Cl. .................................................. 369/263
[58] Field of Search ..................... 369/75.1, 75.2, 77.1, 369/77.2, 258, 292, 247, 263

[56] References Cited

U.S. PATENT DOCUMENTS

| | | | |
|---|---|---|---|
| 3,941,402 | 3/1976 | Yankowski et al. | 280/124 R |
| 4,373,200 | 2/1983 | Dunlop | 369/263 |
| 4,553,230 | 11/1985 | Paulson | 369/263 |
| 4,633,973 | 1/1987 | Kitano | 369/248 X |
| 4,731,777 | 3/1988 | Yoshitoshi et al. | 369/263 |
| 4,739,428 | 4/1988 | Kamoshita et al. | 369/75.2 X |
| 4,794,588 | 12/1988 | Yoshitoshi et al. | 369/263 |
| 4,922,478 | 5/1990 | Verhagen | 369/247 |
| 5,042,024 | 8/1991 | Kurosaw et al. | 369/263 |

FOREIGN PATENT DOCUMENTS

| | | | |
|---|---|---|---|
| 1109914 | 6/1961 | Fed. Rep. of Germany | 369/258 |
| 8606537 | 11/1986 | Fed. Rep. of Germany | 369/292 |
| 0156903 | 12/1981 | Japan | 369/292 |
| 0121101 | 7/1983 | Japan | 369/292 |
| 0283469 | 12/1987 | Japan | 369/258 |
| 1016403 | 1/1966 | United Kingdom | 369/263 |
| 1137411 | 12/1968 | United Kingdom | 369/263 |

*Primary Examiner*—Davis L. Willis
*Assistant Examiner*—Edward Sikorski
*Attorney, Agent, or Firm*—Max Fogiel

[57] ABSTRACT

A consumer electronics apparatus, such as a compact disk player installed and operated in a vehicle, includes resilient elements whose attenuation properties prevent shock and vibrations from being transmitted from a base or housing to a chassis or drive mechanism. The resonance frequency is made adjustable while the housing is closed, by adding or removing supplemental resilient elements. Alternatively, the resilience of individual resilient elements may be adjusted by way of a screw. These adjustments vary an effective resulting isolation resilience and thereby optimize reliability of the components. In another embodiment, a system of permanent magnets or electromagnets may be used together with the main resilient elements.

5 Claims, 7 Drawing Sheets

MAGNETIZING
DIRECTION

APPARATUS WITH ADJUSTABLE ISOLATION RESILIENCE CONSUMER ELECTRONICS

The present application is a continuation of the parent application Ser. No. 635,145 filed Dec. 20, 1990, abandoned.

BACKGROUND OF THE INVENTION

Equipment of this type, compact-disk players for example, must provide unexceptionable playback even when subjected to severe vibrations.

The effective mass of the drive mechanism generates in conjunction with the resilient isolating structures a resonance that is more or less evident in the low-frequency range, where experience has demonstrated that the usual spectrum of vibrations is also located, in accordance with the particular attenuation.

One particular drawback of the state-of-the-art equipment is that, since installation conditions, mechanical properties, and utilization and operating situations differ from one vehicle to another, highly specific frequencies in the vibrational spectrum have a negative effect on reliable playback. Frequencies of this type are resonances that cannot be avoided and that have an especially debilitating effect when they coincide with or approach the equipment specific resonance frequency produced by the drive-mechanism mass and resilient isolating structures.

SUMMARY OF THE INVENTION

The object of the present invention is to solve the problem that the television resonance frequencies become powerful enough to prevent the requisite playback reliability.

This object is attained in that the equipment resonance frequency $f_o$ generated by the mass of the drive mechanism, the resilient isolating structures, and their attenuation can be adjusted to attain optimal playback reliability when various outstanding amplitudes occur in the vibrational spectrum.

Resonance frequency $f_o$ is adjusted by varying the effective resulting resilience. This can be done by lowering resonance frequency $f_o$ relatively extensively by using weak resilient structures and adding more later to the ready-to-install equipment if any vibrational resonances are detected, to shift the resonance to higher frequencies.

Such supplementary resilient structures can on the other hand be inherent in the equipment, in which case its resonance frequency will be relatively high. Some or all of the supplementary resilient structures can be removed to shift the resonance frequency $f_o$ to a lower range.

It is on the other hand also possible in accordance with the invention to adjust already present resilient structures by redistributing them. These adjustments must be possible without opening the equipment's housing.

BRIEF DESCRIPTION OF THE DRAWINGS

The principle behind the invention will now be described with reference to the drawing, wherein.

DESCRIPTION OF THE PREFERRED EMBODIMENTS

Figure 1:
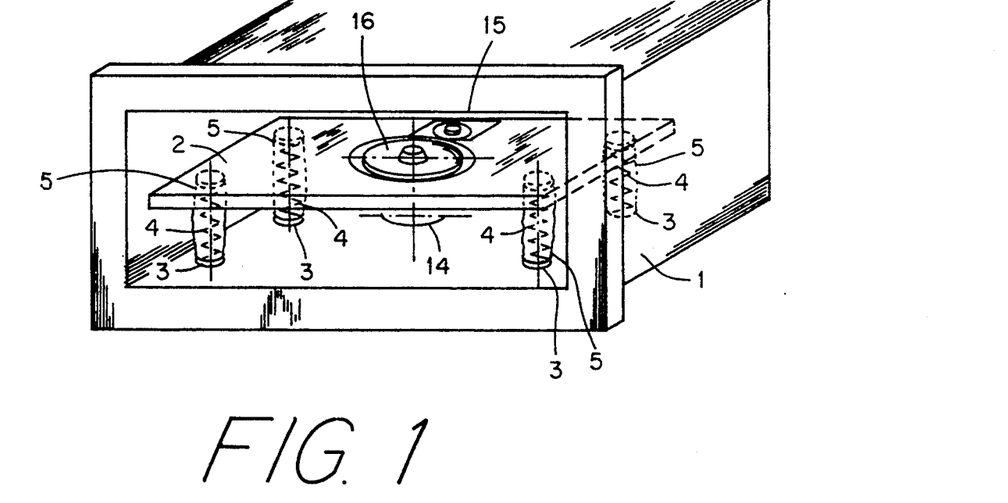
FIG. 1 is a perspective view of a state-of-the-art compact-disk player.

FIG. 1 illustrates a compact-disk player with a housing 1 that accommodates a drive mechanism, a vehicle element, consisting of a motor 14, a turntable 16, and a pick-up 15.

The excess resonance frequency $f_o = (\frac{1}{2}\pi K) \cdot \sqrt{C/M}$, wherein C is the resulting resilience and M is the mass of the drive mechanism that is to be dissociated, is attenuated at the state of the art with four main resilient isolating structures 3 in the form of helical compression springs 4 accommodated in rubber sleeves 5.

Figure 2:
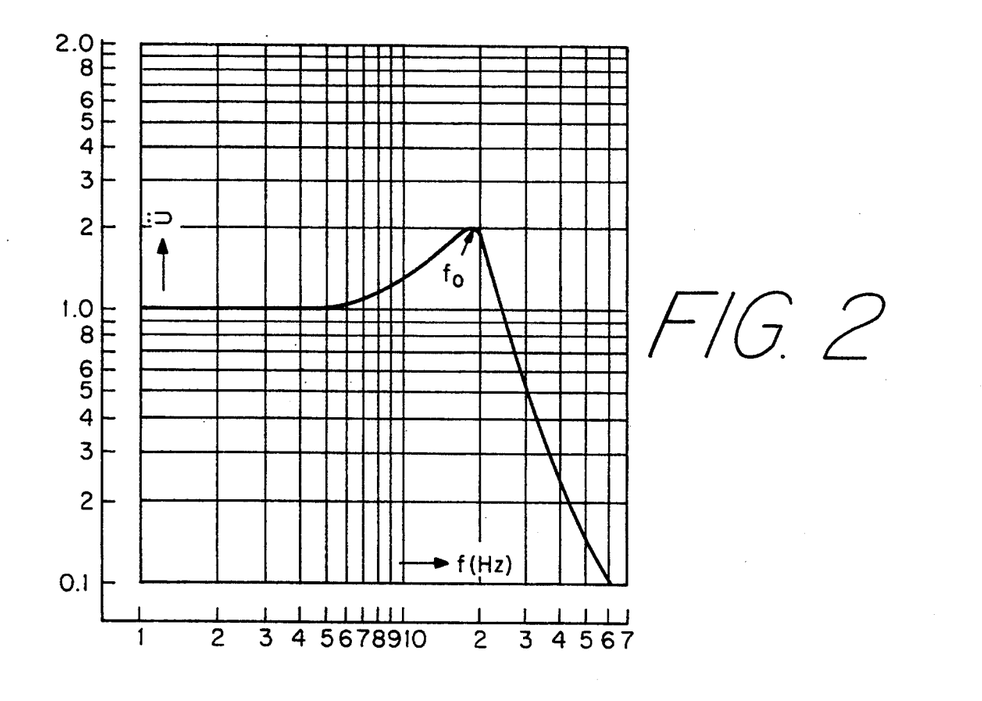
FIG. 2 is a graph of the drive-mechanism resonance $f_o$ characteristic of the type of player illustrated in FIG. 1.

The typical resonance frequency $f_o$ illustrated in FIG. 2 is 19 Hz with an excess Ü of 2. Excess Ü is a function of frequency f (in Hz), and excitation is assumed in the form of a constant vibrational acceleration b. It will be evident from FIG. 2 that the motion of the drive mechanism will be augmented at vibrational frequencies of approximately 6 to 24 Hz. When, as the example shows, the vibrations themselves are reinforced within their own spectrum by resonances, playback will be disrupted and it may become impossible to continue playing the disk.

Figure 3:
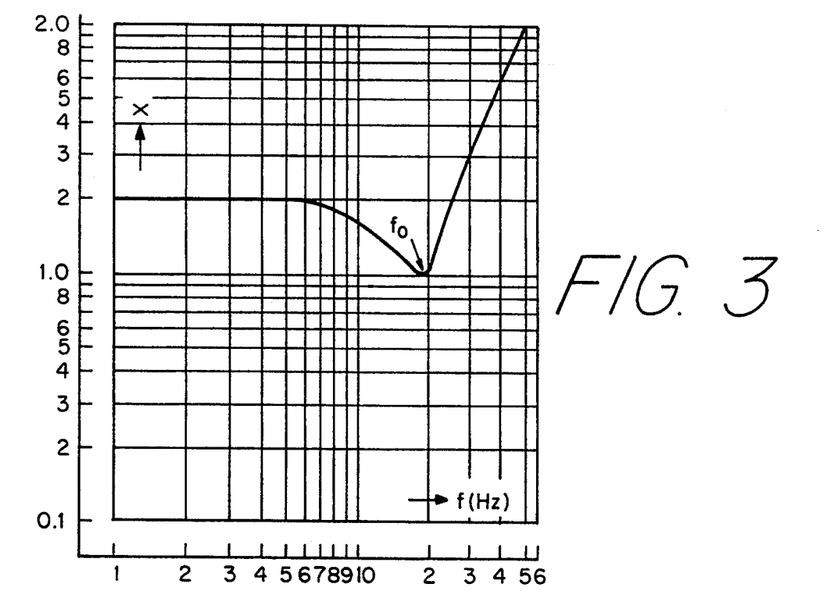
FIG. 3 is a graph of the playback reliability x characteristic of a conventional drive-mechanism resonance $f_o$.

The boundary of undisrupted playback is represented by the concept of pickup reliability. Pickup reliability x is proportional to the reciprocal of the particular vibration acceleration b. Thus $x = k \cdot 1/b$, wherein k is a constant with the dimension $s^2/m$. In the present example, wherein $k = 4s^2/m$, the drive mechanism will have the pickup reliability x represented as a reflection of the acceleration in FIGS. 2 and 3.

Figure 4:
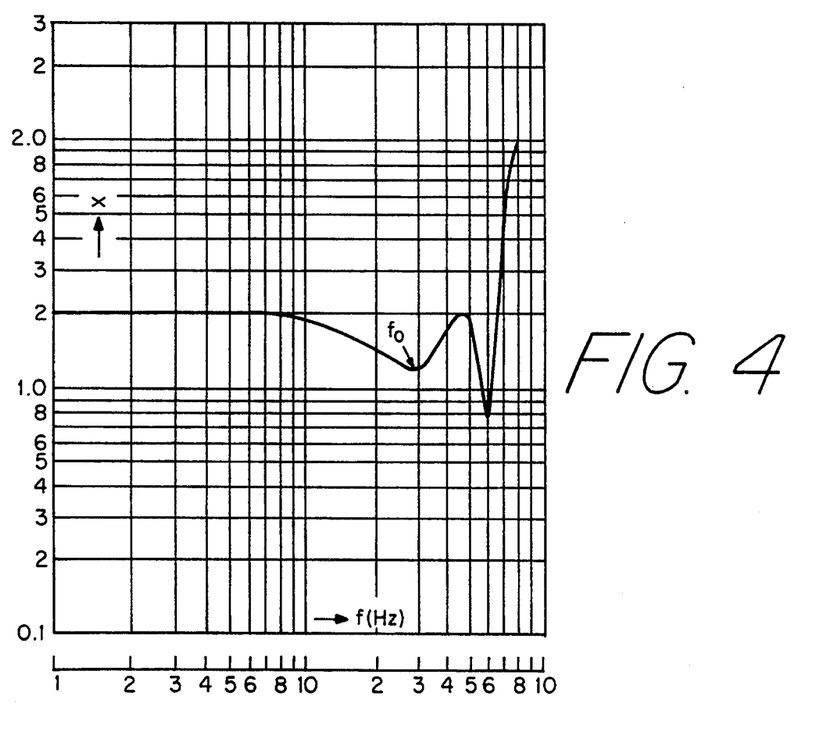
FIG. 4 is a graph of a playback reliability x augmented by supplementary resilient structures.

The pickup reliability x of a drive mechanism originally equipped with removable supplementary resilient structures is illustrated in FIG. 4. In this case, resonance frequency $f_o = 30$ Hz with an excess Ü = 1.5.

A disruptive resonance at $f_R = 60$ Hz ($Ü_R = 17$) will generate, in addition to a minimum at 30 Hz, a very obvious pickup-reliability minimum at 60 Hz.

Although a drive-mechanism minimum of x = 1.4 for example at $f_o$ is still acceptable, meaning that playback will continue, a pickup-reliability minimum of x = 0.73 at $f_R$ = 6 will definitely lead to playback malfunction.

Figure 5:
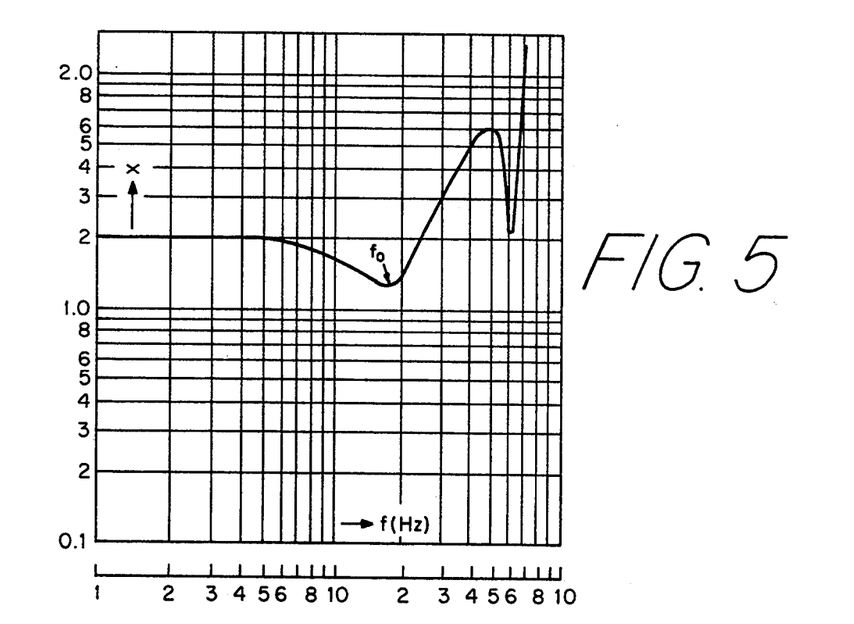
FIG. 5 is a graph illustrating a shift in drive-mechanism resonance $f_o$ as a consequence of removing the supplementary resilient structures by way of example.

Removing the supplementary resilient structures will lead in this example to a resonance frequency $f_o$ = 19 Hz ($\ddot{U}_o$ = 1.5), and the previously detrimental effect of disruptive resonance $f_R$ = 60 ($\ddot{U}_R$ = 17) will be eliminated. The minimum pickup reliability x = 2.05 at 60 Hz will now, as will be evident from the curve in FIG. 5, no longer lead to pickup malfunction.

Figure 6:
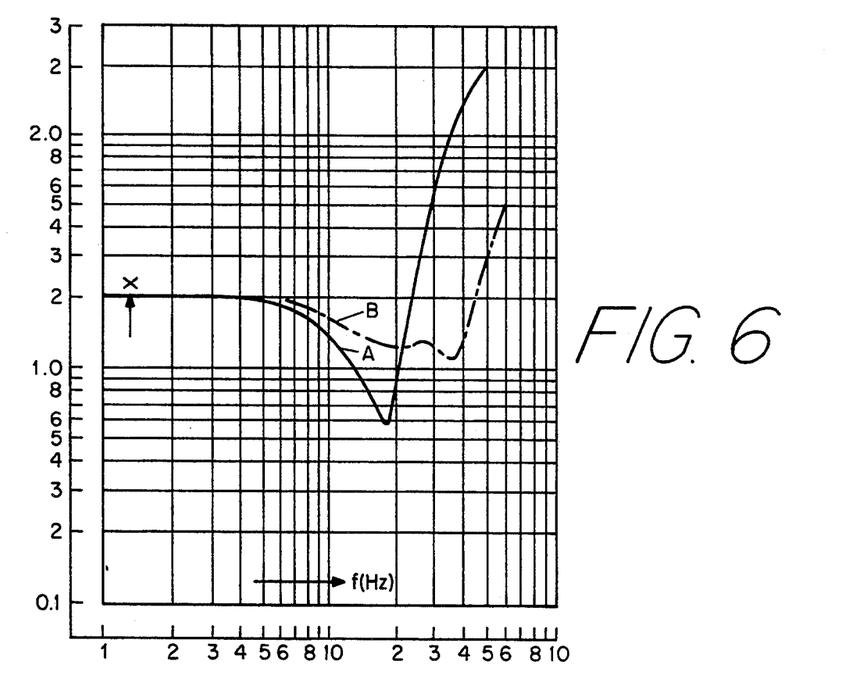
FIG. 6 is a graph illustrating two examples with differing playback reliabilities.

Another example will now be presented to demonstrate that it may sometimes be practical to make the resilient isolating structures in the drive mechanism more rigid in order to shift a resonance to higher frequencies. The curve A in FIG. 6 represents the pickup reliability when resonance frequency $f_o$ coincides with disruptive resonance $f_R$. Here $f_o$ = 19 Hz, $\ddot{U}_o$ = 3, $f_R$ = 19, and $\ddot{U}_R$ = 1.5. The pickup reliability x = 0.55 leads to malfunction. Shifting $f_o$ to 40 Hz (Curve B) improves the minimum pickup reliability to x = 1.05. If more resilient structures were employed in order to shift to lower frequencies, there would be no improvement in the height of the minimum. This is because the drive-mechanism resonance should when possible be higher than any disruptive resonance that is present due to excitation. The excitation accelerations that arrive at the drive mechanism must then be compared with an upstream low-pass filter.

Figure 7:
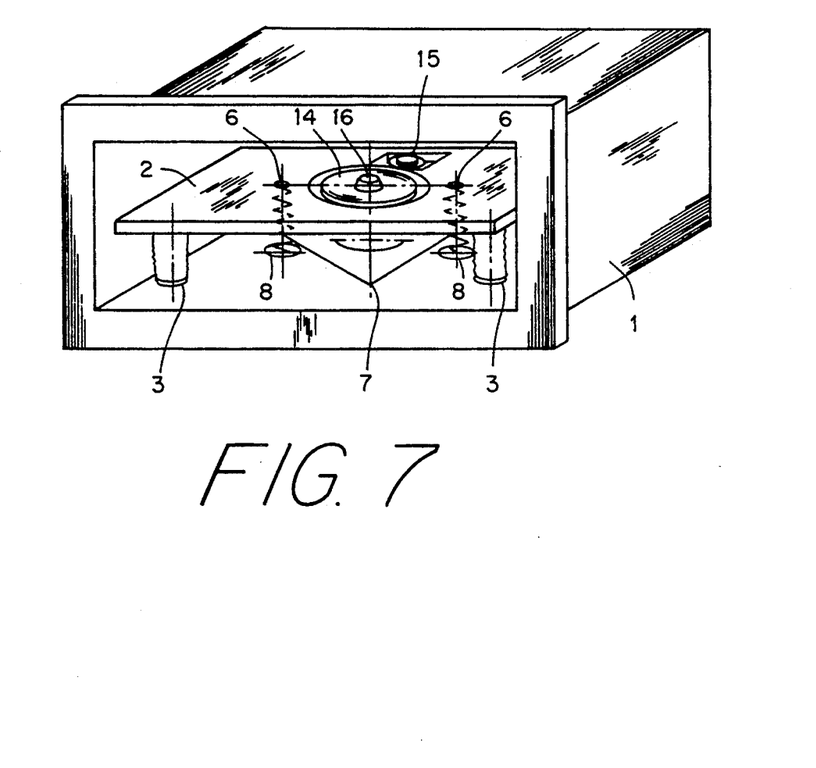
FIG. 7 is a perspective view of a compact-disk player with supplementary resilient structures, FIG. 8 comprises incomplete perspective views a) and b) of two different ways of including supplementary resilient structures.
Figure 8:
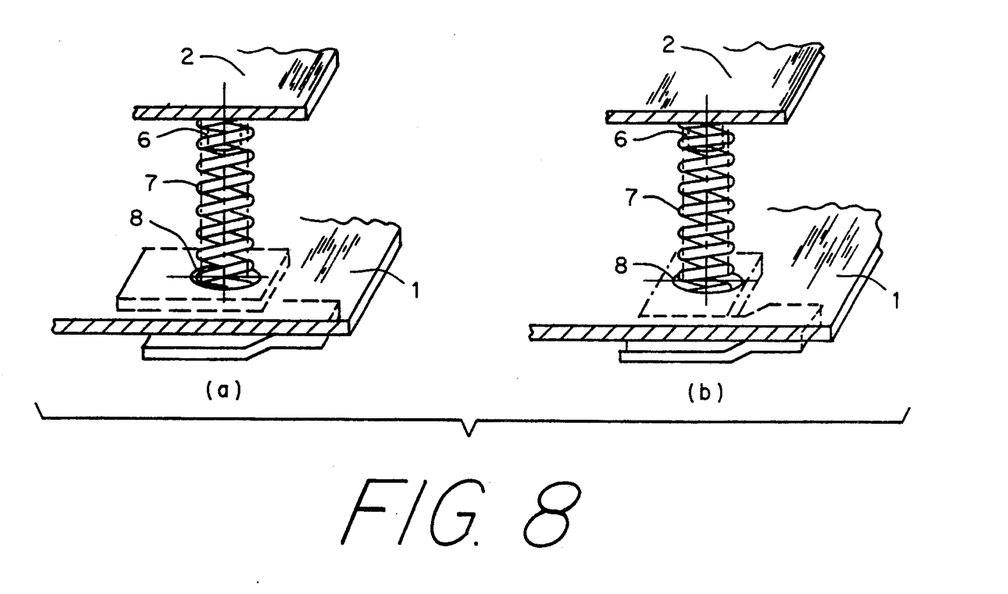

FIG. 7 illustrates an embodiment with two supplementary resilient isolating structures 7 distributed symmetrical to structures 3. Structures 7 can simply be inserted and removed as necessary as illustrated in FIG. 8. Chassis 2, a vehicle element, has two pins 6 and housing 1 two bores 8 at the same location. Supplementary structures 7 can extend through bores 8. The structures can be rotated 90° to secure them to or release them from housing 1 as illustrated in FIGS. 8a and 8b.

Figure 9:
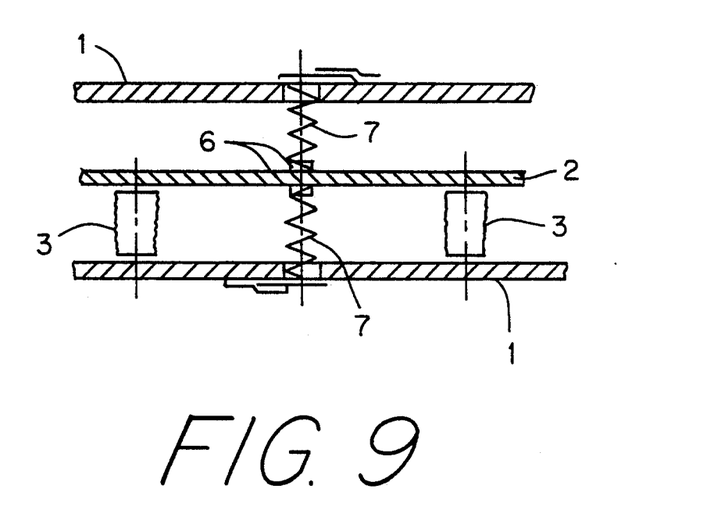
FIG. 9 is a simplified section illustrating supplementary resilient structures in the form of two counteractive compression springs.

The supplementary resilient structures, which are compression springs, exert a pressure component on the drive mechanism, relieving the main isolating structures and accordingly relocating the rest position of the drive mechanism, which rests with its inherent weight on these structures. This can be compensated for by positioning supplementary resilient structures on the other side of the drive mechanism as illustrated in FIG. 9.

Figure 10:
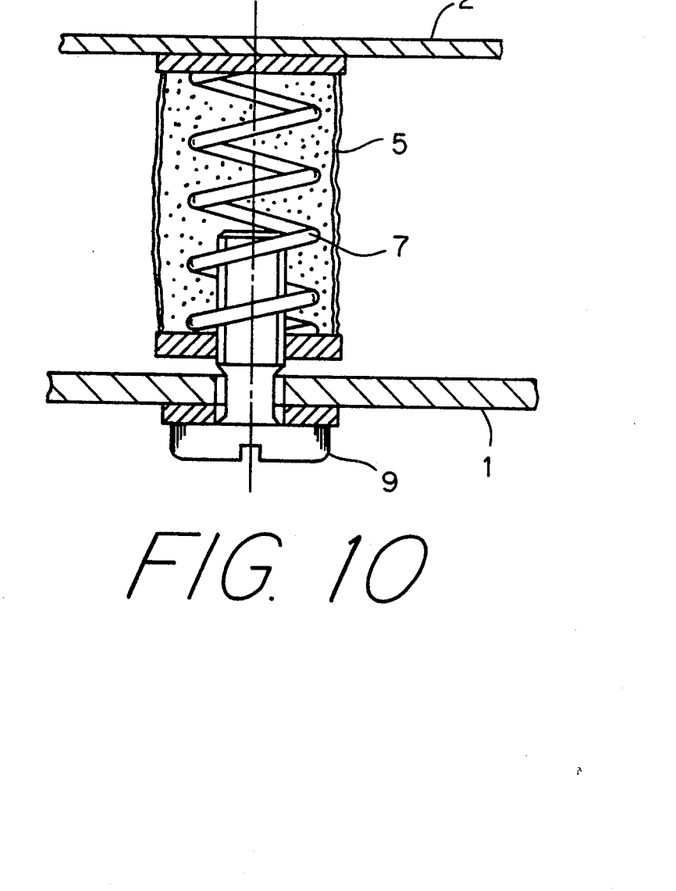
FIG. 10 is a longitudinal section through an adjustable resilient isolating structure, FIG. 11 consists of four extremely simplified perspective views (a through d) of a base for a drive mechanism and components of a housing with adjustable resilient structures installed subsequently at various angles to the direction the vehicle travels.

FIG. 10 illustrates an isolating structure 7 with a resilience that can be varied by way of a screw 9. No supplementary resilient isolating structures are needed with this embodiment.

The drive mechanisms in the embodiments in question are installed horizontally and the acceleration is excited vertically.

Figure 11:
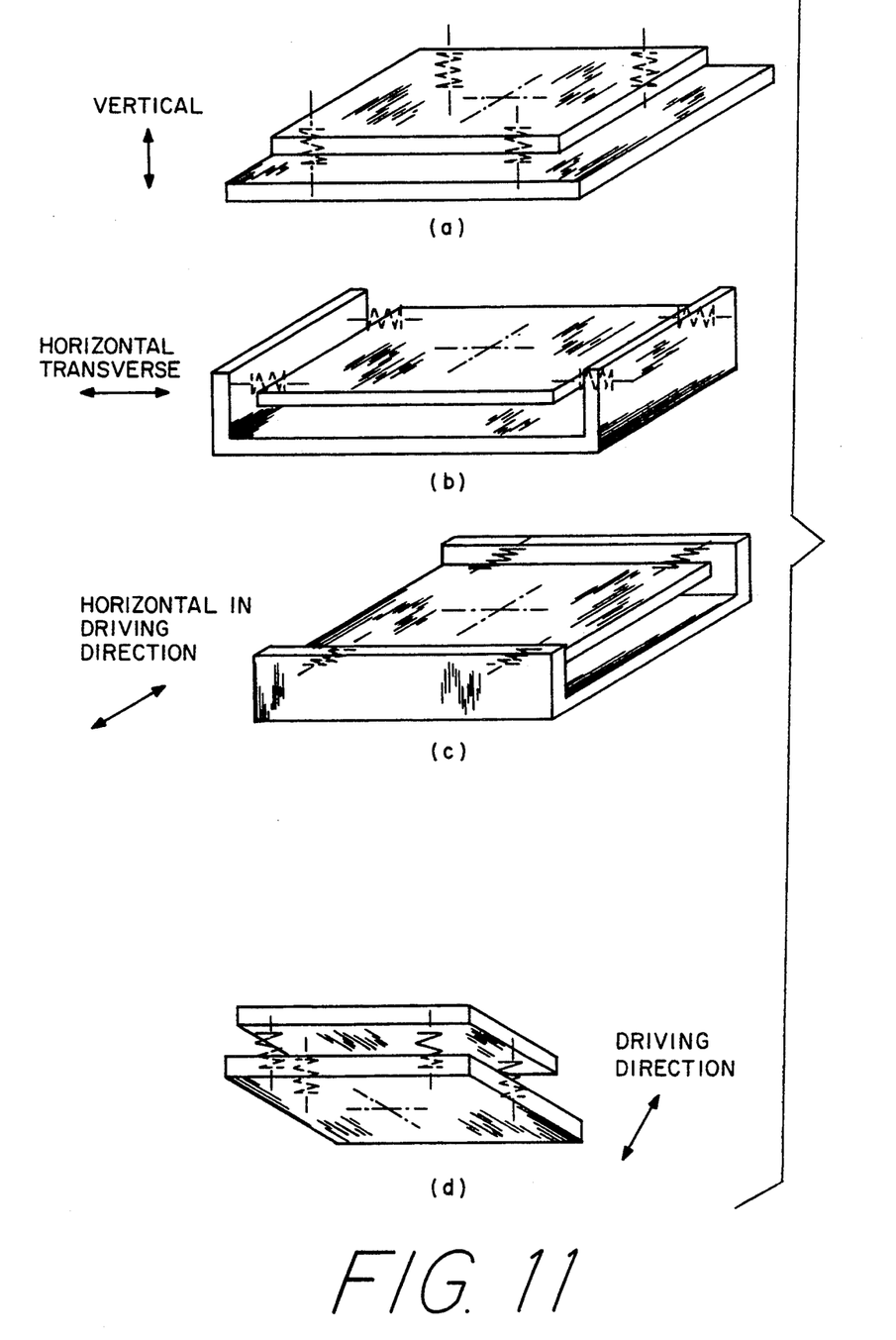

The principle behind the instant invention is not restricted to such characteristics however. Although vertical excitation conditions are highly significant in relation to players installed in motor vehicles, adjustable resilient structures that act horizontally and parallel to or even at a right angle to the direction the vehicle travels may also be desirable. FIGS. 11a to 11d schematically illustrate the position of the drive mechanism in relation to the housing and the direction that any resilient structures that might be employed in a motor vehicle act in. The mechanism illustrated in FIG. 11d is installed not horizontal but at an angle to the direction of travel.

One advanced embodiment of the invention uses a system of magnets to displace the resonance frequency.

Figure 12:
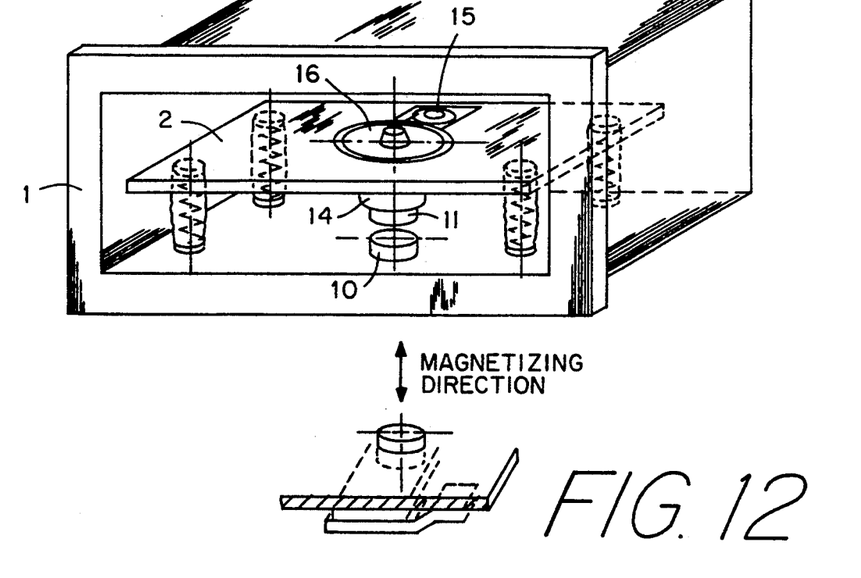
FIG. 12 is a perspective view of a supplementary resilient structure in the form of a permanent magnet.

A permanent magnet 10 mounted on the housing exerts a force on a magnetic component 11 of the drive mechanism and accordingly displaces the resonance frequency dictated by the positions of the resilient isolating structures 3 and the mass of the drive mechanism (cf. FIG. 12).

Figure 13:
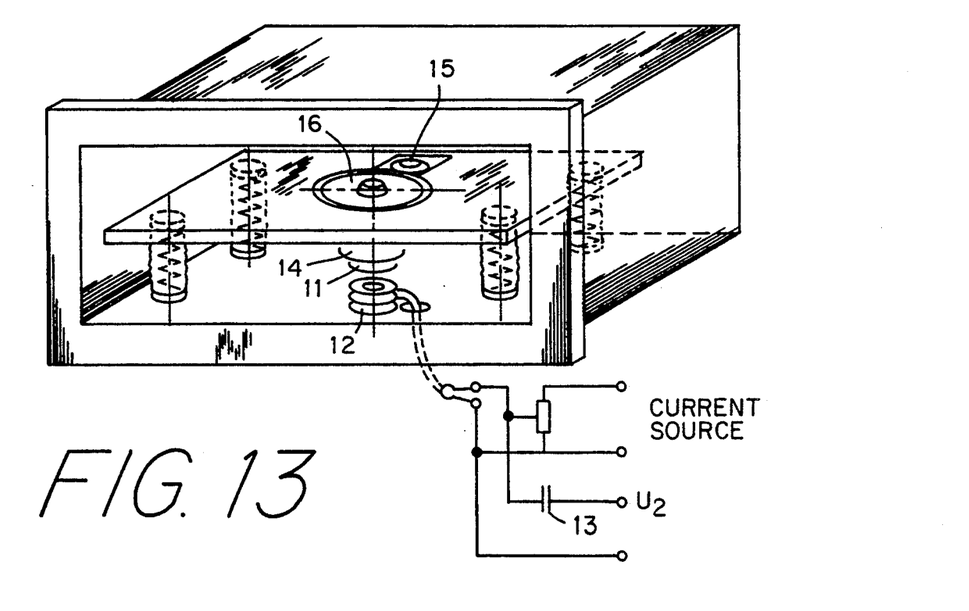
FIG. 13 is a perspective view of a system incorporating electromagnetic supplementary resilient structures.

Electromagnets can be employed instead of permanent magnets, in which event the desired force components can be constantly varied by the volume of current flowing through an induction coil 12 as illustrated in FIG. 13.

Finally, the electromagnetic approach can be simultaneously exploited to measure the dynamics of the motion of the drive mechanism in relation to the housing. The alternating-current voltage that occurs in coil 12 while the drive mechanism is in motion is diverted through a capacitor 13 and supplied in the form of a voltage $U_B$ that can for example be utilized as a measure of the particular acceleration amplitude of the drive mechanism in relation to the housing for the purpose of diverting the power employed for focusing and radial adjustment once a threshold has been attain in the servo-loop amplification.

I claim:

1. Consumer electronics apparatus with vibration-sensitive components for installation and operation in vehicles, comprising: housing means; a vehicle element and main resilient elements having attenuating properties between said housing means and said vehicle element for preventing shock and vibrations from being transmitted from said housing means to said vehicle element, said vehicle element having a resonance frequency, said vibration-sensitive components having an effective resulting isolation resilience; means for adjusting said resonance frequency by varying said effective resulting isolation resilience and thereby optimizing operating reliability of said components; said apparatus being a compact disk player installed in a vehicle; said adjusting means having supplemental resilient elements distributed symmetrically to said main resilient elements; said housing means holding said vibration-sensitive components and having two bores; said vehicle element having two pins at substantially the same location as said bores, said supplemental resilient elements extending through said bores and being rotatable to secure releasably said supplemental resilient elements to said housing means, said supplemental resilient elements extending between said pins and said bores, said supplemental resilient elements exerting a pressure component on said vehicle element for relieving said main resilient elements, said vehicle element having a weight resting on said main and supplemental resilient elements.

2. Consumer electronics apparatus as defined in claim 1, wherein said housing means holds said vibration-sensitive components, said housing means being closable.

3. Consumer electronics apparatus as defined in claim 1, wherein said adjusting means varies said resilience by varying the number of supplemental resilient elements.

4. Consumer electronics apparatus with vibration-sensitive components for installation and operation in vehicles, comprising: housing means; a vehicle element and main resilient elements having attenuating properties between said housing means and said vehicle element for preventing shock and vibrations from being transmitted from said housing means to said vehicle element, said vehicle element having a resonance frequency, said vibration-sensitive components having an effective resulting isolation resilience; and means for adjusting said resonance frequency by varying said effective resulting isolation resilience and thereby optimizing operating reliability of said components; said apparatus being a compact disk player installed in a vehicle; said adjusting means housing supplemental resilient elements distributed symmetrically to said main resilient elements; said housing means holding said vibration-sensitive components and having two bores; said vehicle element including a chassis having two pins at substantially the same location as said bores, said supplemental resilient elements extending through said bores and being rotatable to secure releasably said supplemental resilient elements to said housing means, said supplemental resilient elements extending between said pins and said bores, said supplemental resilient elements exerting a pressure component on said vehicle element for relieving said main resilient elements, said vehicle element having a weight resting on said resilient elements; said resilience being variable by varying the number of main and supplemental resilient elements.

5. Consumer electronics apparatus with vibration-sensitive components for installation and operation in vehicles, comprising: housing means; a vehicle element and resilient elements having attenuating properties between said housing means and said vehicle element for preventing shock and vibrations from being transmitted from said housing means to said vehicle element, said vehicle element having a resonance frequency, said vibration-sensitive components having an effective resulting isolation resilience; and means for adjusting said resonance frequency by varying said effective resulting isolation resilience and thereby optimizing operating reliability of said components; said means for adjusting said resonance frequency comprising a system of magnets affecting said resilience; a magnetic component on said vehicle element; said system of magnets comprising a system of electromagnets; an induction coil on said housing means and in alignment with said magnetic component on said vehicle element, said induction coil having excitation current, said resonance frequency being adjustable by varying said excitation current; means for detecting amplitude of acceleration of said vehicle element relative to said housing means; capacitor means for superimposing on alternating signal on said excitation current; said housing means holding said vibration-sensitive components, said alternating voltage being a measure of said amplitude of acceleration of said vehicle element relative to said housing means.

* * * * *